US011365765B2

(12) United States Patent
Akita et al.

(10) Patent No.: US 11,365,765 B2
(45) Date of Patent: Jun. 21, 2022

(54) PROPELLER SHAFT AND PRODUCTION METHOD FOR SAME

(71) Applicant: HITACHI AUTOMOTIVE SYSTEMS, LTD., Hitachinaka (JP)

(72) Inventors: Yasushi Akita, Isehara (JP); Kazuhisa Yokoyama, Yoshitomi-machi (JP); Kenichiro Ishikura, Atsugi (JP); Tatsuya Shimoda, Novi, MI (US)

(73) Assignee: HITACHI ASTEMO, LTD., Hitachinaka (JP)

( * ) Notice: Subject to any disclaimer, the term of this patent is extended or adjusted under 35 U.S.C. 154(b) by 542 days.

(21) Appl. No.: 16/340,049

(22) PCT Filed: Sep. 14, 2017

(86) PCT No.: PCT/JP2017/033232
§ 371 (c)(1),
(2) Date: Apr. 5, 2019

(87) PCT Pub. No.: WO2018/070180
PCT Pub. Date: Apr. 19, 2018

(65) Prior Publication Data
US 2020/0040946 A1    Feb. 6, 2020

(30) Foreign Application Priority Data

Oct. 11, 2016    (JP) .............................. JP2016-199810

(51) Int. Cl.
*F16D 3/06* (2006.01)
*F16C 3/03* (2006.01)
*F16D 1/10* (2006.01)

(52) U.S. Cl.
CPC .................. *F16D 3/06* (2013.01); *F16C 3/03* (2013.01); *F16D 1/10* (2013.01); *F16C 2202/02* (2013.01);
(Continued)

(58) Field of Classification Search
CPC ........ F16C 3/023; F16C 3/03; F16C 2202/02; F16C 2220/60; F16D 1/10; F16D 1/112;
(Continued)

(56) References Cited

U.S. PATENT DOCUMENTS 8,382,378 B2 * 2/2013 Fukumura ................. F16D 1/10
384/544
9,566,998 B2    2/2017 Kurokawa
(Continued)

FOREIGN PATENT DOCUMENTS

DE    102014002731 A1 * 9/2015 .............. F16D 1/116
JP    2006-123820 A    5/2006
(Continued)

OTHER PUBLICATIONS

Translation of 2006-123820. NSK Ltd. Telescopic Shaft for Vehicle Steering. May 18, 2006.*

*Primary Examiner* — Josh Skroupa
(74) *Attorney, Agent, or Firm* — Foley & Lardner LLP

(57) ABSTRACT

A low surface-roughness part is formed at a first tapered part, as a result, the roughness of an opening-edge of a groove part of an internal spline part that opens at the first tapered part is reduced, and surface pressure applied by the opening edge to a tooth of an external spline part can be reduced. As a result, the opening edge of the groove part of the internal spline part can be kept from digging into the tooth, and variation, between products, in the insertion load of a second shaft part can be suppressed.

12 Claims, 6 Drawing Sheets

(52) U.S. Cl.
CPC .... *F16C 2220/60* (2013.01); *F16D 2250/003* (2013.01); *F16D 2250/0084* (2013.01); *Y10T 403/7035* (2015.01)

(58) Field of Classification Search
CPC ............... F16D 3/06; F16D 2001/103; F16D 2250/003; F16D 2250/0084; Y10T 403/7026; Y10T 403/7028; Y10T 403/7035
USPC ............................... 403/359.1, 359.2, 359.6
See application file for complete search history.

(56) References Cited

U.S. PATENT DOCUMENTS

| | | |
|---|---|---|
| 10,247,247 B2 * | 4/2019 | Yanagidani ............... F16D 1/10 |
| 10,352,365 B2 * | 7/2019 | Hiraoka ................... F16D 1/10 |
| 2016/0084317 A1 | 3/2016 | Akita et al. |

FOREIGN PATENT DOCUMENTS

| | | | | |
|---|---|---|---|---|
| JP | 2007247769 A | * | 9/2007 | ............. F16D 1/116 |
| JP | 2009-185872 A | | 8/2009 | |
| JP | 2010-054027 A | | 3/2010 | |
| JP | 2016-061366 A | | 4/2016 | |
| WO | WO-2005015041 A1 | * | 2/2005 | ............. F16D 1/101 |
| WO | WO-2006074683 A1 | * | 7/2006 | ............. F16D 1/116 |
| WO | WO-2008029017 A2 | * | 3/2008 | ............. F16D 1/116 |
| WO | WO-2014/192653 A1 | | 12/2014 | |

* cited by examiner

PROPELLER SHAFT AND PRODUCTION METHOD FOR SAME

TECHNICAL FIELD

The present invention relates to a propeller shaft and a production method for the propeller shaft.

BACKGROUND ART

A patent document 1 discloses a known conventional propeller shaft as follows.

This propeller shaft includes a first shaft connected to a transmission, and a second shaft connected to a differential gear, wherein the first and second shafts are connected to each other via a so-called collapse mechanism that is implemented by spline fitting. The first shaft is composed of a first shaft piece and a second shaft piece, wherein the first and second shaft pieces are prepared separately and connected to each other via a collapse mechanism that is formed by an internal spline part of the first shaft piece and an external spline part of the second shaft piece.

PRIOR ART DOCUMENT(S)

Patent Document(s)

Patent Document 1: JP 2016-61366 A

SUMMARY OF THE INVENTION

Problem(s) to be Solved by the Invention

However, this conventional propeller shaft is given no regard to surface roughness of an end face of the internal spline part of the first shaft piece, the end face facing the second shaft piece. This surface roughness causes a problem of dispersing a load of insertion of the second shaft piece.

In view of the technical problem about the conventional propeller shaft, the present invention has been made for providing a propeller shaft and a production method for the propeller shaft, which serve to reduce a dispersion in insertion load of a component including an external spline part (i.e. a second shaft piece).

Means for Solving the Problem(s)

According to one aspect of the present invention, a surface of a first taper part is formed lower in surface roughness than one of a first larger-radius part, a second larger-radius part, and a second taper part.

This propeller shaft is preferably produced by: a first taper part cutting operation in which a surface of the first taper part is cut by machining to be lower in surface roughness than one of the second taper part, the first larger-radius part, and the second larger-radius part; a second taper part cutting operation in which a surface of the second taper part is cut by machining; a first larger-radius part cutting operation in which a surface of the first larger-radius part is cut by machining; a second larger-radius part cutting operation in which a surface of the second larger-radius part is cut by machining; and an insertion operation in which the second shaft piece is inserted into the tubular section of the first shaft piece via the first end side of the first shaft piece.

Effect(s) of the Invention

The present invention serves to reduce the dispersion in insertion load of the external spline part (the second shaft piece).

BRIEF DESCRIPTION OF THE DRAWINGS

FIGS. 6A, 6B, 6C, and 6D are longitudinal sectional views of the first shaft piece for illustrating operations for processing the first shaft piece, wherein FIG. 6A shows a first larger-radius part cutting operation, FIG. 6B shows a first taper part cutting operation, FIG. 6C shows a second larger-radius part cutting operation, and FIG. 6D shows a second taper part cutting operation.

FIGS. 7A, 7B, and 7C are schematic views illustrating an operation of inserting the second shaft piece, wherein FIG. 7A shows a stage before the second shaft piece is inserted, FIG. 7B shows a stage where the second shaft piece is being inserted, and FIG. 7C shows a stage where insertion of the second shaft piece is completed to put the second shaft piece in a state of spline fitting corresponding to FIG. 4.

MODE(S) FOR CARRYING OUT THE INVENTION

The following describes a propeller shaft and a production method for the propeller shaft according to an embodiment of the present invention with reference to the drawings. The propeller shaft is exemplified as one applied to an automotive vehicle conventionally.

Figure 1:
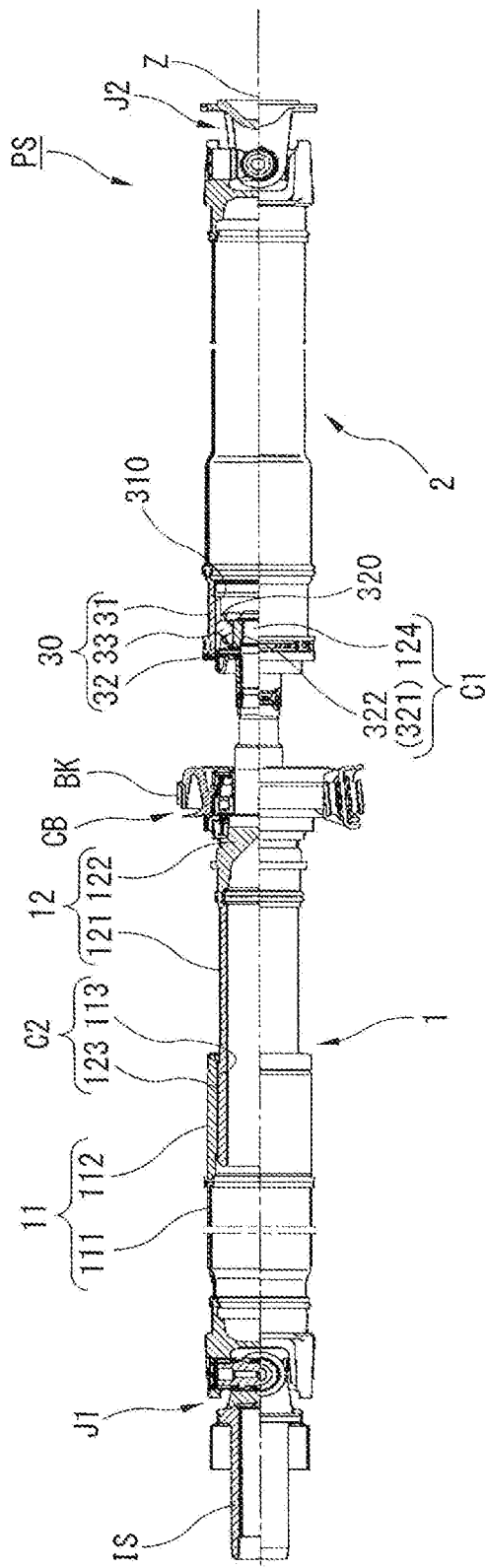
FIG. 1 is a longitudinal half-sectional view of a propeller shaft according to the present invention.

In the following description, for convenience, left and right sides in each drawing are respectively referred to as "front" and "rear" sides, and directions along and around a rotation axis Z of propeller shaft PS shown in FIG. 1 are respectively referred to as "axial direction" and "circumferential direction".

(Configuration of the Propeller Shaft)

FIG. 1 is a side view of propeller shaft PS, showing whole configuration of propeller shaft PS.

As shown in FIG. 1, propeller shaft PS includes a first shaft 1 structured to receive a driving force transmitted from a drive source not shown, and a second shaft 2 structured to rotate integrally with first shaft 1 due to the driving force transmitted via first shaft 1. First shaft 1 and second shaft 2 are integrally rotatably connected to each other via a constant-velocity joint 30.

First shaft 1 includes: a front end integrally rotatably connected to an input shaft IS via a first cross joint 31 serving as a first shaft joint, wherein input shaft IS is connected to a transmission not shown; and a rear end rotatably supported by a center bearing CB, wherein center bearing CB is suspended from a vehicle body not shown by a bracket BK well-known.

Furthermore, first shaft 1 is composed of two tubular pieces arranged in the axial direction: a first shaft piece 11 as a front one and a second shaft piece 12 as a rear one. First shaft piece 11 and second shaft piece 12 are connected to each other via spline fitting between an internal spline part 113 and an external spline part 123 described below. This spline fitting forms a second collapse connection C2 described below.

First shaft piece 11 includes: a first tube 111 that has a cylindrical shape comparatively thin-walled and includes a front end welded to first cross joint 31 by friction welding; and a second tube 112 that has a cylindrical shape comparatively thick-walled and includes a front end welded to a rear end of first tube 111 by friction welding. Second tube 112 corresponds to "tubular section" defined in claim 1 of the present application.

Second shaft piece 12 includes: a tubular member 121 that has a comparatively large radius and includes a front end connected to first shaft piece 11 via the spline fitting; and a shaft-forming member 122 that has a comparatively small radius decreasing stepwise toward its rear end and includes a front end welded to a rear end of tubular member 121 by friction welding.

Second shaft 2 includes a rear end integrally rotatably connected to an output shaft not shown via a second cross joint 32 serving as a second shaft joint, wherein the output shaft is connected to a differential gear not shown.

Constant-velocity joint 30 includes: an outer wheel 31 that has a tubular shape and is provided at a front end of second shaft 2; an inner wheel 32 that has a tubular shape, and is provided around an outer periphery of a rear end of shaft-forming member 122, to face an inner periphery of outer wheel 31; and a plurality of balls 33 rollably interposed between outer wheel 31 and inner wheel 32.

Outer wheel 31 includes axial grooves 310 in its inner periphery, wherein each axial groove 310 is formed by cutting to have a straight recessed shape extending in the axial direction. Axial grooves 310 allow a relative movement between outer wheel 31 and inner wheel 32 in the axial direction along with rolling of balls 33 in axial grooves 310, and restrict a relative movement between outer wheel 31 and inner wheel 32 in the circumferential direction by engagement between balls 33 and axial grooves 310.

Radially inside the inner wheel 32, a shaft insertion hole 321 is formed to extend through along an axis of inner wheel 32. Inner wheel 32 includes an internal spline part 322 in its inner periphery. Internal spline part 322 is formed by cutting to extend in the axial direction and be fitted with an external spline part 124 inserted in the axial direction, wherein external spline part 124 is formed by cutting in an outer periphery of the rear end of shaft-forming member 122. Inner wheel 32 further includes axial grooves 320 in its outer periphery, wherein each axial groove 320 is formed by cutting to extend in the axial direction, similar to axial grooves 310 of outer wheel 31.

External spline part 124 of shaft-forming member 122 and internal spline part 322 of inner wheel 32 form a first collapse connection C1 serving as a so-called collapse mechanism. When the vehicle collides with something, this mechanism allows shaft-forming member 122 and inner wheel 32 to relatively move in a shortening direction via both spline parts 124 and 322 under a collision load inputted in a longitudinal direction, and thereby suppresses propeller shaft PS from being bent.

Figure 2:
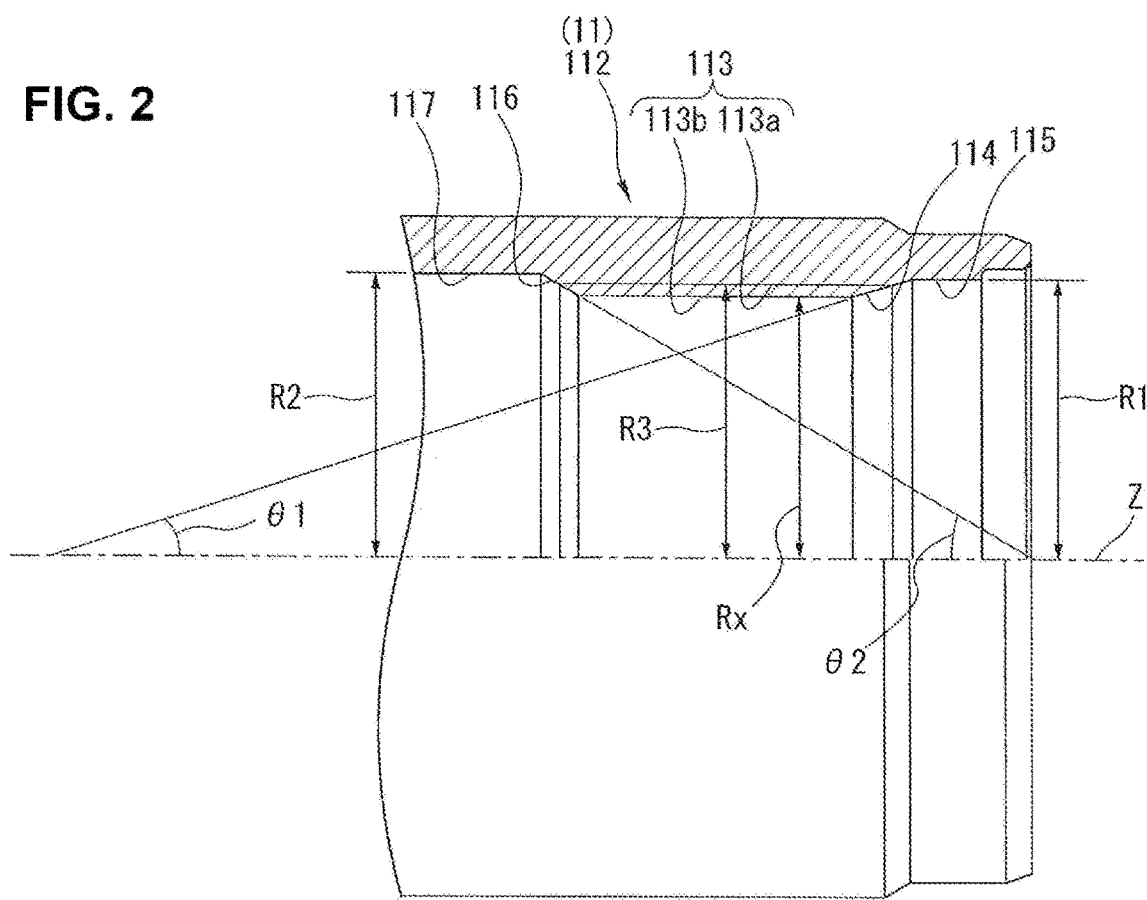
FIG. 2 is a longitudinal half-sectional view of a first shaft piece shown in FIG. 1.

FIG. 2 is an enlarged longitudinal half-sectional view of second tube 112, showing internal spline part 113 and its vicinity of second tube 112.

As shown in FIG. 2, internal spline part 113 is formed by cutting to extend in an inner periphery of second tube 112 in the axial direction, wherein second tube 112 is a tubular section of first shaft piece 11 provided at a first end side (a rear end side) of first shaft piece 11. Internal spline part 113 has a tooth trace parallel to rotation axis Z (see FIG. 4), wherein both ends of internal spline part 113 in the axial direction are tapered.

Specifically, second tube 112 includes a first taper part 114 at a first end (or rear end) of internal spline part 113. First taper part 114 is formed such that: an inner radius Rx of second tube 112 gradually increases in first taper part 114 from the rear end of internal spline part 113 toward the rear end side of second tube 112, wherein inner radius Rx is a distance from rotation axis Z to an inner periphery of second tube 112; and grooves 113a of internal spline part 113 are open-ended at first taper part 114.

First taper part 114 is further formed to have a minor angle θ1 less than a minor angle θ2, wherein: minor angle θ1 is a minor one of relative angles formed by first taper part 114 and rotation axis Z; and minor angle θ2 is a minor one of relative angles formed by a second taper part 116 described below and rotation axis Z.

Second tube 112 further includes, in its inner periphery, a first larger-radius part 115 closer to the first end side (rear end side) of second tube 112 in the axial direction than first taper part 114. First larger-radius part 115 is formed to have an inner radius R1 greater than a distance R3 from rotation axis Z to grooves 113a of internal spline part 113.

Moreover, second tube 112 includes second taper part 116 at a second end (or front end) of internal spline part 113. Second taper part 116 is formed such that: inner radius Rx gradually increases in second taper part 116 from the front end of internal spline part 113 toward a front end side of second tube 112; and grooves 113a of internal spline part 113 are open-ended at second taper part 116.

Furthermore, second tube 112 includes, in its inner periphery, a second larger-radius part 117 closer to a second end side (the front end side) of second tube 112 in the axial direction than second taper part 116. Second larger-radius part 117 is formed to have an inner radius R2 greater than distance R3 from rotation axis Z to grooves 113a of internal spline part 113.

Both of first taper part 114 and first larger-radius part 115 are machined through a sequence of cutting operations described below using a common cutter TL. Similarly, second taper part 116 and second larger-radius part 117 are machined through a sequence of cutting operations described below using the same cutter TL.

First taper part 114 includes, in its surface, a lower-surface-roughness portion 114a formed by cutting to be lower in surface roughness than one of first larger-radius part 115, second larger-radius part 117, and second taper part 116. The surface roughness of lower-surface-roughness portion 114a is set to a so-called arithmetic mean roughness value Ra of 6 or less (Ra≤6), lower than that of a third taper part 125 described below. Lower-surface-roughness portion 114a is formed by machining at a feed speed slower than that of a cutting operation for the second taper part described below, or a cutting operation for the first larger-radius part described below, or a cutting operation for the second larger-radius part described below.

Figure 3:
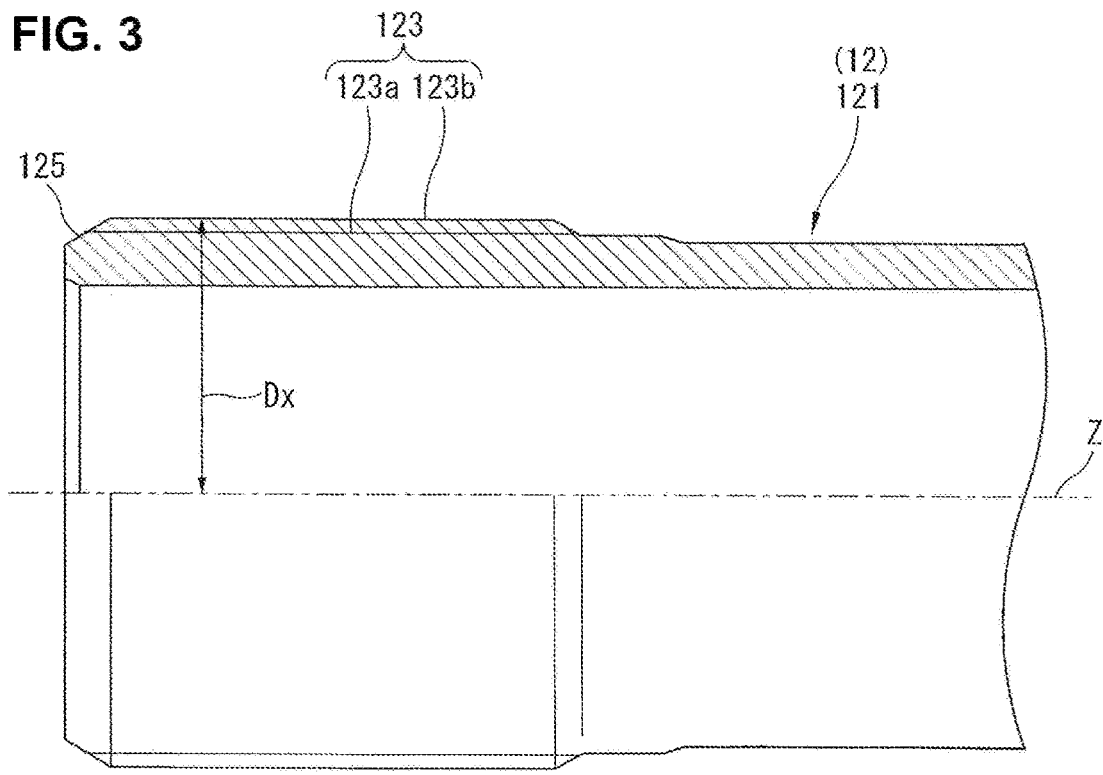
FIG. 3 is a longitudinal half-sectional view of a second shaft piece shown in FIG. 1.

FIG. 3 is an enlarged longitudinal half-sectional view of tubular member 121, showing external spline part 123 and its vicinity of tubular member 121.

As shown in FIG. 3, external spline part 123 is formed by cutting in an outer periphery of a first end side (or front end side) of tubular member 121, wherein the first end side of tubular member 121 is structured to be inserted into second tube 112 via the rear end side of first shaft piece 11, and wherein external spline part 123 is structured to be fitted with internal spline part 113 in the axial direction.

External spline part 123 includes third taper part 125 at its first end (or front end). Third taper part 125 is formed such that: an outer radius Dx of tubular member 121 gradually decreases in third taper part 125 from the front end of external spline part 123 toward the front end side of tubular member 121; and grooves 123a of external spline part 123 are open-ended at third taper part 125.

Figure 4:
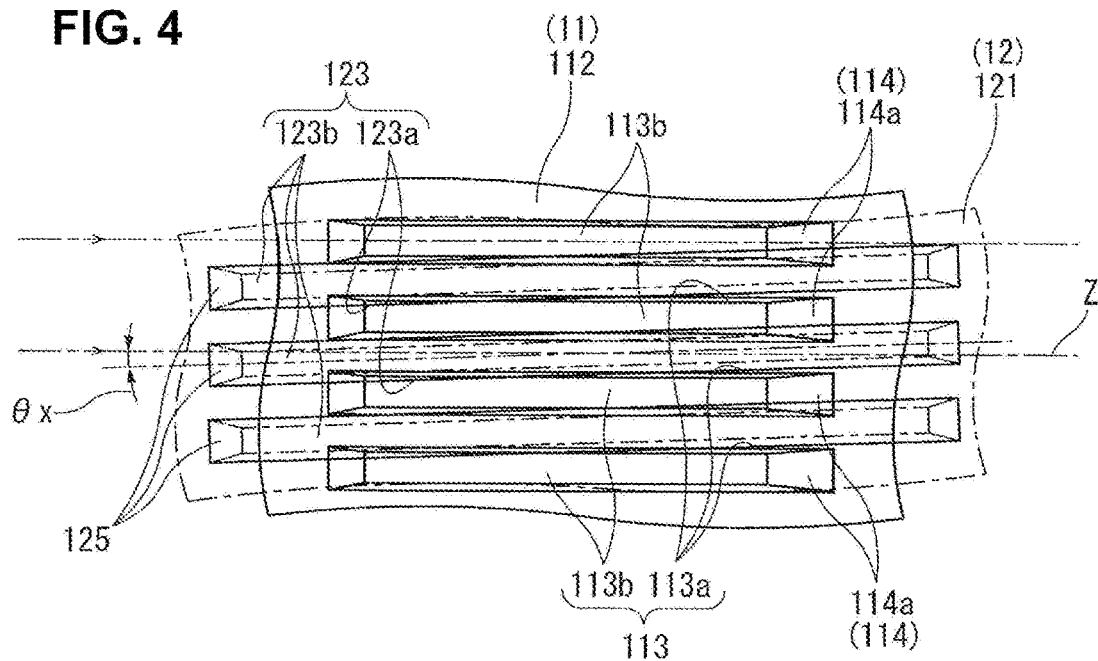
FIG. 4 is a schematic view illustrating how internal and external spline parts of a second collapse connection shown in FIG. 1 are fitted with each other.

FIG. 4 is a schematic view illustrating how internal spline part 113 and external spline part 123 of second collapse connection C2 are fitted with each other.

As shown in FIG. 4, external spline part 123 is formed to have a tooth trace inclined with respect to rotation axis Z, in contrast to internal spline part 113 described above. In other words, internal spline part 113 and external spline part 123 are configured to have a relative angle θx formed between a direction of the tooth trace of internal spline part 113 with respect to the rotation axis Z and a direction of the tooth trace of external spline part 123 with respect to the rotation axis Z.

Due to this configuration, internal spline part 113 and external spline part 123 are fitted with each other along with a torsional deformation of teeth 123b of external spline part 123 in a direction of its tooth thickness, wherein the torsional deformation corresponds to the inclination of external spline part 123. In this situation, each tooth 123b of external spline part 123 is inserted (press-fitted) in groove 113a of internal spline part 113 within a region of elastic deformation. This elastic deformation of external spline part 123 generates a restoring force that presses each tooth 123b of external spline part 123 on tooth 113b of internal spline part 113 adjacent to tooth 123b in the circumferential direction, and thereby generates a frictional force that keeps positions of first shaft piece 11 and second shaft piece 12 in the axial direction.

Figure 5:
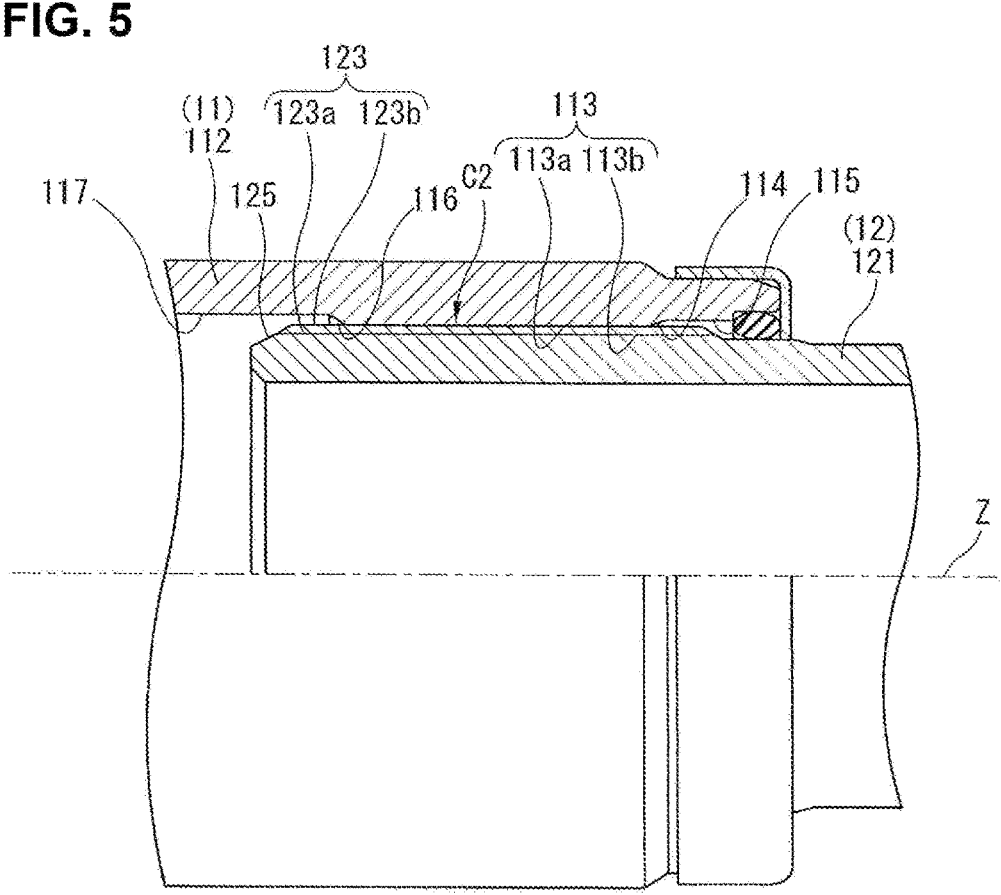
FIG. 5 is an enlarged longitudinal half-sectional view of the second collapse connection shown in FIG. 1.

FIG. 5 is an enlarged longitudinal half-sectional view of second collapse connection C2 and its vicinity.

As shown in FIG. 5, according to the above configuration of the spline fitting, internal spline part 113 and external spline part 123 form the second collapse connection C2 serving as a second collapse mechanism. When the vehicle collides with something, second collapse connection C2 allows first shaft piece 11 and second shaft piece 12 to relatively move in a shortening direction via both spline parts 113 and 123, and thereby suppresses propeller shaft PS from being bent, similar to first collapse connection C1.

(Production Method for the Propeller Shaft)

The following describes a production method for the propeller shaft according to the present embodiment of the present invention, focusing on a process for machining the inner periphery of second tube 112 and a process for connecting first shaft piece 11 and second shaft piece 12, with reference to FIGS. 6A to 6D and FIGS. 7A to 7C.

Figure 6A:
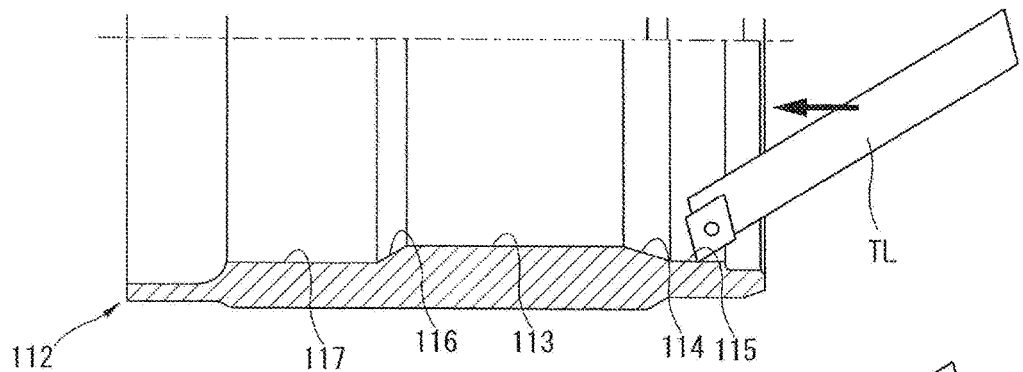
Figure 6B:
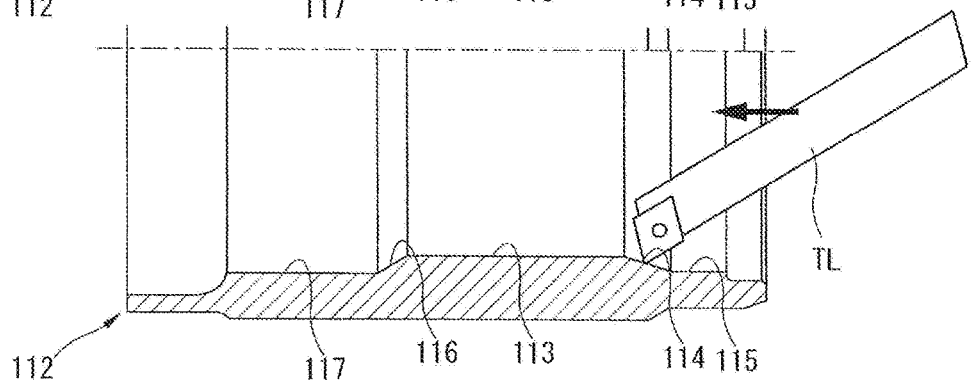
Figure 6C:
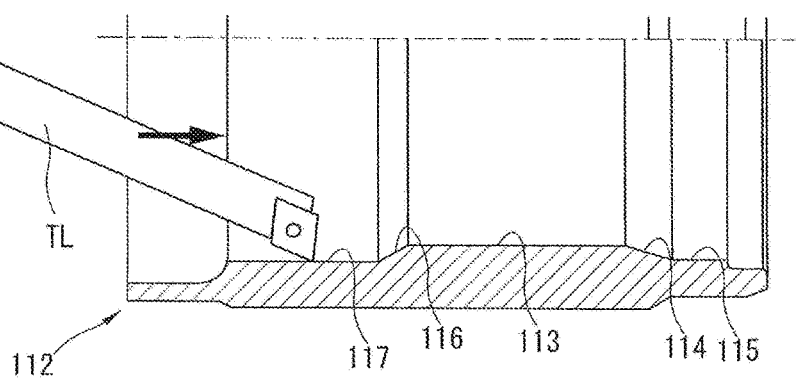
Figure 6D:
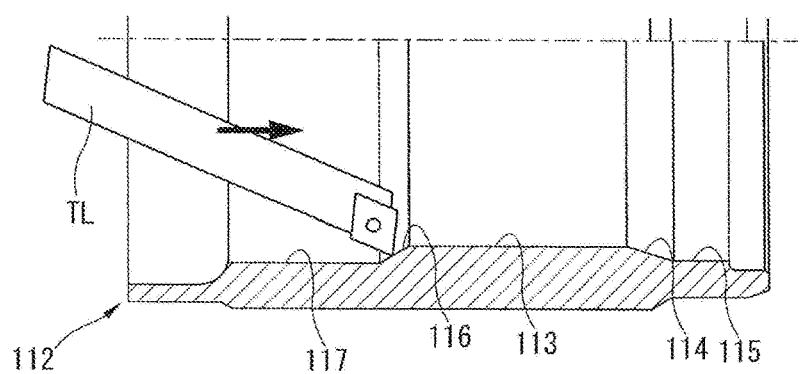

FIGS. 6A, 6B, 6C, and 6D are longitudinal half-sectional views of second tube 112, illustrating the process for machining the inner periphery of second tube 112, wherein FIG. 6A shows a first larger-radius part cutting operation, FIG. 6B shows a first taper part cutting operation, FIG. 6C shows a second larger-radius part cutting operation, and FIG. 6D shows a second taper part cutting operation.

The machining of the inner periphery of second tube 112 is started with putting the cutter TL into second tube 112 via its rear end side, and cutting the first larger-radius part 115 by cutter TL, while rotating the second tube 112 chucked on a lathe not shown, as shown in FIG. 6A (the first larger-radius part cutting operation). Subsequently, as shown in FIG. 6B, cutter TL is made to travel ahead inward and cut the first taper part 114 (the first taper part cutting operation). As described above, during formation of first taper part 114, lower-surface-roughness portion 114a is formed in the surface of first taper part 114 by machining at a feed speed slower than that of the first larger-radius part cutting operation, or the second larger-radius part cutting operation described below, or the second taper part cutting operation described below.

Next, cutter TL is maintained in second tube 112 and made to cut the teeth 113b of internal spline part 113. Thereafter, cutter TL is put into second tube 112 via its front end side, i.e. the opposite side in the axial direction, and is made to cut the second larger-radius part 117 as shown in FIG. 6C (the second larger-radius part cutting operation). Subsequently, cutter TL is made to travel ahead inward and cut the second taper part 116 as shown in FIG. 6D (the second taper part cutting operation).

After the machining of the inner periphery of second tube 112, second shaft piece 12 (tubular member 121) is inserted into the inner peripheral side of first shaft piece 11 (second tube 112) via the rear end side of first shaft piece 11 (an insertion process).

Figure 7A:
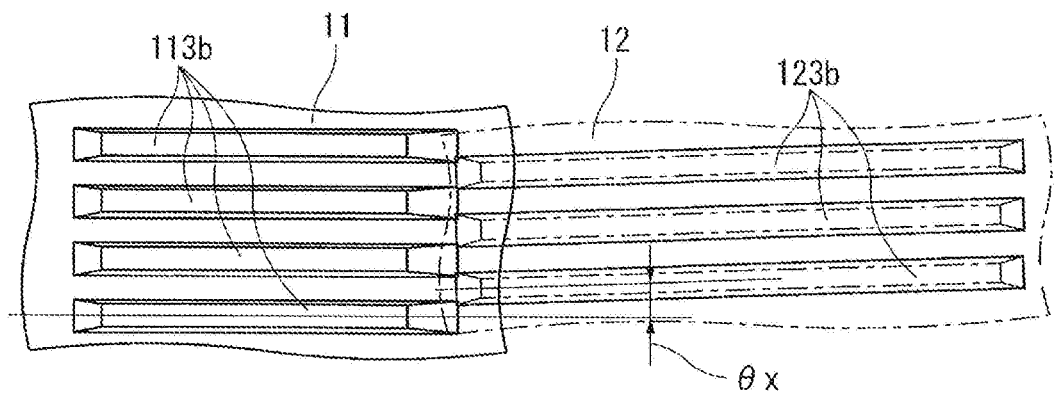
Figure 7B:
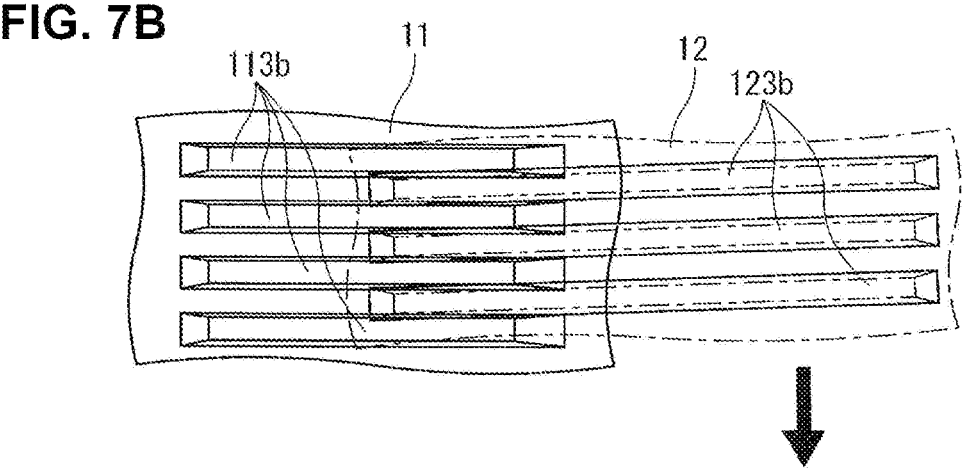
Figure 7C:
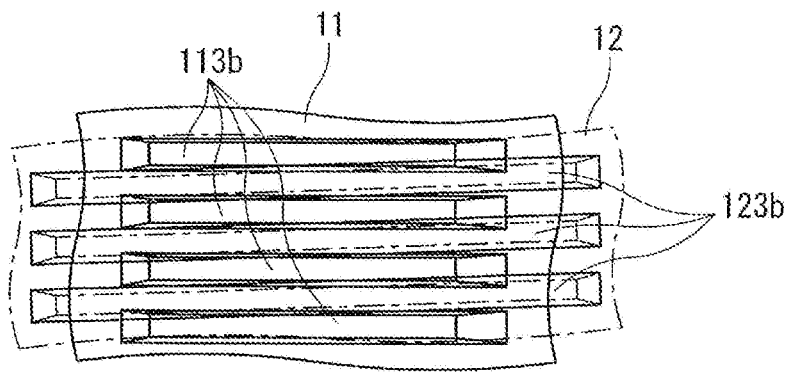

FIGS. 7A, 7B, and 7C are views illustrating steps of the process for inserting second shaft piece 12 into first shaft piece 11. In these drawings, solid lines and virtual lines respectively represent first shaft piece 11 (second tube 112) and second shaft piece 12 (tubular member 121).

Specifically, as shown in FIG. 7A, the rear end of first shaft piece 11 (internal spline part 113) and the front end of second shaft piece 12 (external spline part 123) are brought face-to-face with each other. Subsequently, as shown in FIG. 7B, from this situation that internal spline part 113 and external spline part 123 have relative angle θx therebetween, second shaft piece 12 is inserted into first shaft piece 11 while twisted in a direction of an arrow in FIG. 7B. This causes an elastic torsion of each tooth 123b of external spline part 123 in the tooth thickness direction, and brings each tooth 123b into press contact with adjacent tooth 113b of internal spline part 113 for fitting between external spline part 123 and internal spline part 113. Then, as shown in FIG. 7C, internal spline part 113 and external spline part 123 fit with each other throughout their entire range in the axial direction, and the connection of first shaft piece 11 and second shaft piece 12 is thus completed.

Effects of the Embodiment

Figure 8A:
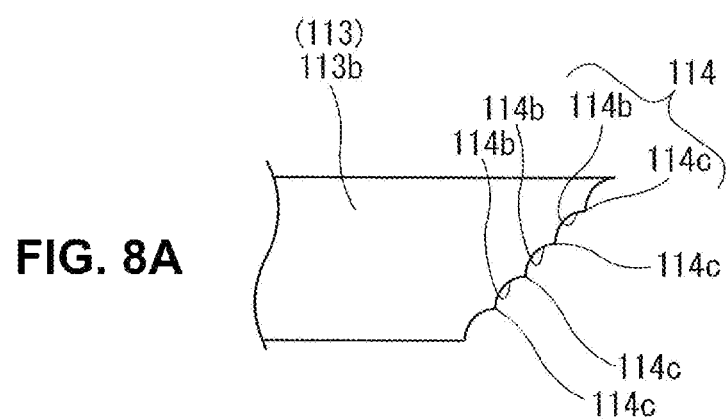
FIG. 8A is an enlarged view of a first taper part of a conventional internal spline part.
Figure 8B:
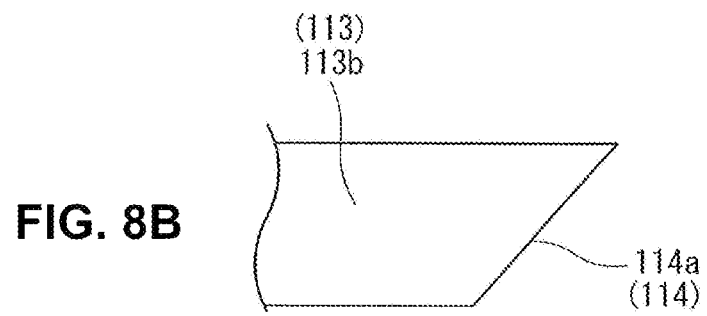
FIG. 8B is an enlarged view of a first taper part of the internal spline part shown in FIG. 2.

FIGS. 8A and 8B are enlarged sectional views of a focal portion of first taper part 114, wherein FIG. 8A shows a surface of first taper part 114 according to a conventional propeller shaft, and FIG. 8B shows a surface of first taper part 114 (lower-surface-roughness portion 114a) according to the present embodiment.

As described above, the conventional propeller shaft is given no regard to the surface roughness of first taper part 114. In other words, the conventional propeller shaft includes first taper part 114 whose surface includes microscopic recesses 114b and projections 114c, as shown in FIG. 8A. Accordingly, during insertion (press fitting) of second shaft piece 12, projections 114c are liable to bite teeth 123b of external spline part 123, wherein projections 114c are in open edges of grooves 113a of internal spline part 113 open-ended at first taper part 114. This causes a problem that the insertion load of second shaft piece 12 disperses depending on presence or absence and extent (magnitude) of the biting.

Especially in the present embodiment where internal spline part 113 and external spline part 123 have relative angle θx therebetween, the process of fitting external spline part 123 to internal spline part 113 needs application of a twisting force in the circumferential direction along with application of the insertion load in the axial direction as described above. In reaction to these press forces during insertion of external spline part 123, each tooth 123b of external spline part 123 is applied with an excessive surface pressure from the open edge of groove 113a of internal spline part 113. This causes projections 114c to bite and scrape a flank of each tooth 123b of external spline part 123, wherein projections 114c are in the open edges of grooves 113a of internal spline part 113 open-ended at first taper part 114. This increases a frictional force in the direction of insertion of second shaft piece 12, and accordingly causes the insertion load dispersion.

In contrast, propeller shaft PS according to the present embodiment serves to solve the problem about the conventional propeller shaft by producing the following beneficial effects.

Propeller shaft PS includes a shaft unit for transmitting a driving force from a drive source to a driving wheel, wherein the shaft unit includes first shaft piece 11 and second shaft piece 12, wherein: first shaft piece 11 includes second tube 112 at its first end side; second tube 112 of first shaft piece 11 includes, in its inner periphery, internal spline part 113, first taper part 114, first larger-radius part 115, second taper part 116, and second larger-radius part 117; second shaft piece 12 includes external spline part 123 in the outer periphery of its first end side, wherein the first end side of second shaft piece 12 is structured to be inserted into second tube 112 of first shaft piece 11 via the first end side of first shaft piece 11, and wherein external spline part 123 is structured to fit with internal spline part 113; first taper part 114 is formed at the first end of internal spline part 113 in the direction of rotation axis Z of the shaft unit such that inner radius Rx of second tube 112 gradually increases in first taper part 114 from the first end of internal spline part 113 toward the first end side of second tube 112 in the direction of rotation axis Z and such that groove 113a of internal spline part 113 is open-ended at the first taper part 114, wherein inner radius Rx is the distance from rotation axis Z to the inner periphery of second tube 112; first larger-radius part 115 is formed closer to the first end side of second tube 112 in the direction of rotation axis Z than first taper part 114 such that first larger-radius part 115 has inner radius R1 greater than distance R3 from rotation axis Z to groove 113a of internal spline part 113; second taper part 116 is formed at the second end of internal spline part 113 in the direction of rotation axis Z such that inner radius Rx of second tube 112 gradually increases in second taper part 116 from the second end of internal spline part 113 toward the second end side of second tube 112 in the direction of rotation axis Z and such that groove 113a of internal spline part 113 is open-ended at second taper part 116; second larger-radius part 117 is formed closer to the second end side of second tube 112 in the direction of rotation axis Z than second taper part 116 such that second larger-radius part 117 has the inner radius greater than distance R3 from rotation axis Z to groove 113a of internal spline part 113; and first taper part 114 includes lower-surface-roughness portion 114a in its surface, wherein lower-surface-roughness portion 114a is lower in surface roughness than one of first larger-radius part 115, second larger-radius part 117, and second taper part 116.

In this way, as shown especially in FIG. 8B, the present embodiment is configured such that first taper part 114 includes lower-surface-roughness portion 114a to have a reduced surface roughness value. This configuration smooths recesses and projections of the open edge of each groove 113a of internal spline part 113 open-ended at first taper part 114, and thereby reduces the surface pressure on each tooth 123b of external spline part 123 from the open edge. Then, this suppresses the open edge of each groove 113a of internal spline part 113 from biting the tooth 123b of external spline part 123, and thereby suppresses the problem that the insertion load of second shaft piece 12 disperses for each product.

Furthermore, according to the present embodiment, internal spline part 113 and external spline part 123 are formed to have relative angle θx between the direction of the tooth trace of internal spline part 113 with respect to rotation axis Z and the direction of the tooth trace of external spline part 123 with respect to rotation axis Z.

Due to this configuration of forming relative angle θx between the tooth trace directions of both spline parts 113 and 123, they fit with each other along with torsional deformation of their teeth 113b and 123b. This improves strength of fitting between both spline parts 113 and 123.

Furthermore, according to the present embodiment, the direction of the tooth trace of internal spline part 113 is parallel to rotation axis Z, and the direction of the tooth trace of external spline part 123 is inclined with respect to rotation axis Z.

This configuration of forming internal spline part 113 parallel to rotation axis Z has an advantage to facilitate the machining of internal spline part 113 that is comparatively difficult to machine.

Furthermore, according to the present embodiment, the surface roughness of lower-surface-roughness portion 114a has arithmetic mean roughness value Ra of 6 or less.

This configuration of setting the surface roughness (Ra) of first taper part 114 less than or equal to 6 serves to sufficiently smooth the recesses and projections in the open edge of groove 113a of internal spline part 113 open-ended at first taper part 114.

Furthermore, according to the present embodiment, external spline part 123 includes tooth 123b structured to be inserted into groove 113a of internal spline part 113 within its region of elastic deformation.

This configuration of limiting the deformation of tooth 123b of external spline part 123 within the region of elastic deformation serves to further suppress the insertion load dispersion for each product.

Furthermore, according to the present embodiment, first taper part 114 is formed such that minor angle θ1 between first taper part 114 and rotation axis Z is less than minor angle θ2 between second taper part 116 and rotation axis Z.

The smaller inclination angle (θ1) of first taper part 114 facilitates the insertion of second shaft piece 12. On the other hand, the larger inclination angle (θ2) of second taper part 116 serves to shorten second taper part 116 in the axial direction.

Furthermore, according to the present embodiment: second shaft piece 12 includes third taper part 125 in its outer periphery; third taper part 125 is formed at the first end of external spline part 123 such that the outer radius of second shaft piece 12 gradually decreases in third taper part 125 from the first end of external spline part 123 toward the first end side of second shaft piece 12 and such that groove 123a of external spline part 123 is open-ended at third taper part 125, wherein the outer radius is the distance from rotation axis Z to the outer periphery of second shaft piece 12; and lower-surface-roughness portion 114a is set lower in surface roughness than third taper part 125.

This configuration of setting third taper part 125 of second shaft piece 12 greater in surface roughness than first taper part 114 allows third taper part 125 to be easily machined.

Furthermore, propeller shaft PS includes the shaft unit for transmitting a driving force from the drive source to the driving wheel, wherein the shaft unit includes first shaft piece 11 and second shaft piece 12, wherein: first shaft piece 11 includes second tube 112 at its first end side; second tube 112 of first shaft piece 11 includes internal spline part 113 and first taper part 114 in its inner periphery; second shaft piece 12 includes external spline part 123 in the outer periphery of its first end side, wherein the first end side of second shaft piece 12 is structured to be inserted into second tube 112 of first shaft piece 11 via the first end side of first shaft piece 11, and wherein external spline part 123 is structured to fit with internal spline part 113; first taper part 114 is formed at the first end of internal spline part 113 in the direction of rotation axis Z of the shaft unit such that inner radius Rx of second tube 112 gradually increases in first taper part 114 from the first end of internal spline part 113 toward the first end side of second tube 112 in the direction of rotation axis Z and such that groove 113a of internal spline part 113 is open-ended at first taper part 114, wherein inner radius Rx is the distance from rotation axis Z to the inner periphery of second tube 112; and first taper part 114 includes lower-surface-roughness portion 114a in its surface, wherein surface roughness of lower-surface-roughness portion 114a has arithmetic mean roughness value Ra of 6 or less.

In this way, as shown especially in FIG. 8B, the present embodiment is configured such that the surface of first taper part 114 is processed to have a surface roughness value (Ra) of 6 or less. This configuration smooths the recesses and projections of the open edge of groove 113a of internal spline part 113 open-ended at first taper part 114, and thereby reduces the surface pressure on each tooth 123b of external spline part 123 from the open edge. Then, this suppresses the open edge of each groove 113a of internal spline part 113 from biting the tooth 123b of external spline part 123, and thereby suppresses the problem that the insertion load of second shaft piece 12 disperses for each product.

Furthermore, according to the present embodiment, the production method for propeller shaft PS including the shaft unit for transmitting a driving force from the drive source to the driving wheel, wherein the shaft unit includes first shaft piece 11 and second shaft piece 12, wherein: first shaft piece 11 includes second tube 112 at its first end side; second tube 112 of first shaft piece 11 includes, in its inner periphery, internal spline part 113, first taper part 114, first larger-radius part 115, second taper part 116, and a second larger-radius part 117; first taper part 114 is formed at the first end of internal spline part 113 in the direction of rotation axis Z of the shaft unit such that inner radius Rx of second tube 112 gradually increases in first taper part 114 from the first end of internal spline part 113 toward the first end side of second tube 112 in the direction of rotation axis Z and such that groove 113a of internal spline part 113 is open-ended at first taper part 114, wherein inner radius Rx is the distance from rotation axis Z to the inner periphery of second tube 112; first larger-radius part 115 is formed closer to the first end side of second tube 112 in the direction of rotation axis Z than first taper part 114 such that first larger-radius part 115 has inner radius R1 greater than distance R3 from rotation axis Z to groove 113a of internal spline part 113; second taper part 116 is formed at the second end of internal spline part 113 in the direction of rotation axis Z such that inner radius Rx of second tube 112 gradually increases in second taper part 116 from the second end of internal spline part 113 toward the second end side of second tube 112 in the direction of rotation axis Z and such that groove 113a of internal spline part 113 is open-ended at second taper part 116; second larger-radius part 117 is formed closer to the second end side of second tube 112 in the direction of rotation axis Z than second taper part 116 such that second larger-radius part 117 has the inner radius greater than distance R3 from rotation axis Z to groove 113a of internal spline part 113; and second shaft piece 12 includes external spline part 123 in the outer periphery of its first end side, wherein the first end side of second shaft piece 12 is structured to be inserted into second tube 112 of first shaft piece 11 via the first end side of first shaft piece 11, and wherein external spline part 123 is structured to fit with internal spline part 113; the production method includes: the first taper part cutting operation in which the surface of first taper part 114 is cut by machining to be lower in surface roughness than one of second taper part 116, first larger-radius part 115, and second larger-radius part 117; the second taper part cutting operation in which the surface of second taper part 116 is cut by machining; the first larger-radius part cutting operation in which the surface of first larger-radius part 115 is cut by machining; the second larger-radius part cutting operation in which the surface of second larger-radius part 117 is cut by machining; and the insertion operation in which second shaft piece 12 is inserted into second tube 112 of first shaft piece 11 via the first end side of first shaft piece 11.

In this way, as shown especially in FIG. 8B, the present embodiment is configured such that first taper part 114 is processed to have lower-surface-roughness portion 114a, and thereby have a low surface roughness value. This configuration smooths the recesses and projections of the open edge of groove 113a of internal spline part 113 open-ended at first taper part 114, and thereby reduces the surface pressure on each tooth 123b of external spline part 123 from the open edge. Then, this suppresses the open edge of each groove 113a of internal spline part 113 from biting the tooth 123b of external spline part 123, and thereby suppresses the problem that the insertion load of second shaft piece 12 disperses for each product.

Furthermore, according to the present embodiment, the first taper part cutting operation is implemented by machining at a slower feed speed than one of the second taper part cutting operation, the first larger-radius part cutting operation, and the second larger-radius part cutting operation.

This configuration of setting slower the feed speed of machining of first taper part 114 during the first taper part cutting operation, serves to reduce the surface roughness of first taper part 114. In other words, this configuration eliminates necessity of a process for finishing first taper part 114 after the machining, and minimizes an adverse effect of the formation of lower-surface-roughness portion 114a on its productivity, and serves to suppress its production cost from being increased.

Furthermore, according to the present embodiment, the first taper part cutting operation and the first larger-radius part cutting operation are implemented in succession by using the same tool (cutter TL).

This configuration that the machining of the first taper part cutting operation and the machining of the first larger-radius part cutting operation are implemented in succession with the same cutter TL while varying the feed speed, serves to form the lower-surface-roughness portion 114a with a reduced surface roughness.

The present invention is not limited to the configurations nor modes exemplified in the above embodiment, but may be freely modified according to requirements in specifications, cost, etc. of an application target, provided that the application target is capable of producing the effects of the present invention described above.

The propeller shaft according to the above embodiment may be exemplified as follows.

The propeller shaft includes, according to its one aspect, a shaft unit for transmitting a driving force from a drive source to a driving wheel, wherein the shaft unit includes a first shaft piece and a second shaft piece, wherein: the first shaft piece includes a tubular section at its first end side; the tubular section of the first shaft piece includes, in its inner periphery, an internal spline part, a first taper part, a first larger-radius part, a second taper part, and a second larger-radius part; the second shaft piece includes an external spline part in an outer periphery of its first end side, wherein the first end side of the second shaft piece is structured to be inserted into the tubular section of the first shaft piece via the first end side of the first shaft piece, and wherein the external spline part is structured to fit with the internal spline part; the first taper part is formed at a first end of the internal spline part in a direction of a rotation axis of the shaft unit such that an inner radius of the tubular section gradually increases in the first taper part from the first end of the internal spline part toward a first end side of the tubular section in the direction of the rotation axis and such that a groove of the internal spline part is open-ended at the first taper part, wherein the inner radius is a distance from the rotation axis to the inner periphery of the tubular section; the first larger-radius part is formed closer to the first end side of the tubular section in the direction of the rotation axis than the first taper part such that the first larger-radius part has an inner radius greater than a distance from the rotation axis to the groove of the internal spline part; the second taper part is formed at a second end of the internal spline part in the direction of the rotation axis such that the inner radius of the tubular section gradually increases in the second taper part from the second end of the internal spline part toward a second end side of the tubular section in the direction of the rotation axis and such that the groove of the internal spline part is open-ended at the second taper part; the second larger-radius part is formed closer to the second end side of the tubular section in the direction of the rotation axis than the second taper part such that the second larger-radius part has an inner radius greater than the distance from the rotation axis to the groove of the internal spline part; and the first taper part includes a lower-surface-roughness portion in its surface, wherein the lower-surface-roughness portion is lower in surface roughness than one of the first larger-radius part, the second larger-radius part, and the second taper part.

According to an exemplary aspect of this propeller shaft, the internal spline part and the external spline part are formed to have a relative angle between a direction of a tooth trace of the internal spline part with respect to the rotation axis and a direction of a tooth trace of the external spline part with respect to the rotation axis.

According to another exemplary aspect of the propeller shaft along with any one of the above aspects, the direction of the tooth trace of the internal spline part is parallel to the rotation axis, and wherein the direction of the tooth trace of the external spline part is inclined with respect to the rotation axis.

According to a further exemplary aspect of the propeller shaft along with any one of the above aspects, the surface roughness of the lower-surface-roughness portion has an arithmetic mean roughness value Ra of 6 or less.

According to a further exemplary aspect of the propeller shaft along with any one of the above aspects, the external spline part includes a tooth structured to be inserted into the groove of the internal spline part within its region of elastic deformation.

According to a further exemplary aspect of the propeller shaft along with any one of the above aspects, the first taper part is formed such that a minor angle between the first taper part and the rotation axis is less than a minor angle between the second taper part and the rotation axis.

According to a further exemplary aspect of the propeller shaft along with any one of the above aspects: the second shaft piece includes a third taper part in its outer periphery; the third taper part is formed at a first end of the external spline part such that an outer radius of the second shaft piece gradually decreases in the third taper part from the first end of the external spline part toward the first end side of the second shaft piece and such that a groove of the external spline part is open-ended at the third taper part, wherein the outer radius is a distance from the rotation axis to the outer periphery of the second shaft piece; and the lower-surface-roughness portion is set lower in surface roughness than the third taper part.

From another point of view about the above embodiment, the propeller shaft includes, according to its one aspect, a shaft unit for transmitting a driving force from a drive source to a driving wheel, wherein the shaft unit includes a first shaft piece and a second shaft piece, wherein: the first shaft piece includes a tubular section at its first end side; the tubular section of the first shaft piece includes an internal spline part and a taper part in its inner periphery; the second shaft piece includes an external spline part in an outer periphery of its first end side, wherein the first end side of the second shaft piece is structured to be inserted into the tubular section of the first shaft piece via the first end side of the first shaft piece, and wherein the external spline part is structured to fit with the internal spline part; the taper part is formed at a first end of the internal spline part in a direction of a rotation axis of the shaft unit such that an inner radius of the tubular section gradually increases in the taper part from the first end of the internal spline part toward a first end side of the tubular section in the direction of the rotation axis and such that a groove of the internal spline part is open-ended at the taper part, wherein the inner radius is a distance from the rotation axis to the inner periphery of the tubular section; and the taper part includes a lower-surface-roughness portion in its surface, wherein surface roughness of the lower-surface-roughness portion has an arithmetic mean roughness value Ra of 6 or less.

Furthermore, the production method for the propeller shaft according to the above embodiment may be exemplified as follows.

According to one aspect of the production method, the propeller shaft includes a shaft unit for transmitting a driving force from a drive source to a driving wheel, wherein the shaft unit includes a first shaft piece and a second shaft piece, wherein: the first shaft piece includes a tubular section at its first end side; the tubular section of the first shaft piece includes, in its inner periphery, an internal spline part, a first taper part, a first larger-radius part, a second taper part, and a second larger-radius part; the first taper part is formed at a first end of the internal spline part in a direction of a rotation axis of the shaft unit such that an inner radius of the tubular section gradually increases in the first taper part from the first end of the internal spline part toward a first end side of the tubular section in the direction of the rotation axis and such that a groove of the internal spline part is open-ended at the first taper part, wherein the inner radius is a distance from the rotation axis to the inner periphery of the tubular section; the first larger-radius part is formed closer to the first end side of the tubular section in the direction of the rotation axis than the first taper part such that the first larger-radius part has an inner radius greater than a distance from the rotation axis to the groove of the internal spline part; the second taper part is formed at a second end of the internal spline part in the direction of the rotation axis such that the inner radius of the tubular section gradually increases in the second taper part from the second end of the internal spline part toward a second end side of the tubular section in the direction of the rotation axis and such that the groove of the internal spline part is open-ended at the second taper part; the second larger-radius part is formed closer to the second end side of the tubular section in the direction of the rotation axis than the second taper part such that the second larger-radius part has an inner radius greater than the distance from the rotation axis to the groove of the internal spline part; and the second shaft piece includes an external spline part in an outer periphery of its first end side, wherein the first end side of the second shaft piece is structured to be inserted into the tubular section of the first shaft piece via the first end side of the first shaft piece, and wherein the external spline part is structured to fit with the internal spline part; the production method includes: a first taper part cutting operation in which a surface of the first taper part is cut by machining to be lower in surface roughness than one of the second taper part, the first larger-radius part, and the second larger-radius part; a second taper part cutting operation in which a surface of the second taper part is cut by machining; a first larger-radius part cutting operation in which a surface of the first larger-radius part is cut by machining; a second larger-radius part cutting operation in which a surface of the second larger-radius part is cut by machining; and an insertion operation in which the second shaft piece is inserted into the tubular section of the first shaft piece via the first end side of the first shaft piece.

According to an exemplary aspect of this production method, the first taper part cutting operation is implemented by machining at a slower feed speed than one of the second taper part cutting operation, the first larger-radius part cutting operation, and the second larger-radius part cutting operation.

According to another exemplary aspect of the production method along with any one of the above aspects, the first taper part cutting operation and the first larger-radius part cutting operation are implemented in succession by using a same tool.

The invention claimed is:
1. A propeller shaft comprising:
a shaft unit for transmitting a driving force from a drive source to a driving wheel, wherein the shaft unit includes a first shaft piece and a second shaft piece, wherein:
the first shaft piece includes a tubular section at its first end side;
the tubular section of the first shaft piece includes, in its inner periphery, an internal spline part, a first taper part, a first larger-radius part, a second taper part, and a second larger-radius part;
the second shaft piece includes an external spline part in an outer periphery of its first end side, wherein the first end side of the second shaft piece is structured to be inserted into the tubular section of the first shaft piece via the first end side of the first shaft piece, and wherein the external spline part is structured to fit with the internal spline part;
the first taper part is formed at a first end of the internal spline part in a direction of a rotation axis of the shaft unit such that an inner radius of the tubular section gradually increases in the first taper part from the first end of the internal spline part toward a first end side of the tubular section in the direction of the rotation axis and such that a groove of the internal spline part is open-ended at the first taper part, wherein the inner radius is a distance from the rotation axis to the inner periphery of the tubular section;
the first larger-radius part is formed closer to the first end side of the tubular section in the direction of the rotation axis than the first taper part such that the first larger-radius part has an inner radius greater than a distance from the rotation axis to the groove of the internal spline part;
the second taper part is formed at a second end of the internal spline part in the direction of the rotation axis such that the inner radius of the tubular section gradually increases in the second taper part from the second end of the internal spline part toward a second end side of the tubular section in the direction of the rotation axis and such that the groove of the internal spline part is open-ended at the second taper part;
the second larger-radius part is formed closer to the second end side of the tubular section in the direction of the rotation axis than the second taper part such that the second larger-radius part has an inner radius greater than the distance from the rotation axis to the groove of the internal spline part; and
the first taper part includes a lower-surface-roughness portion in its surface, wherein the lower-surface-roughness portion is lower in surface roughness than one of the first larger-radius part, the second larger-radius part, or the second taper part.

2. The propeller shaft according to claim 1, wherein the internal spline part and the external spline part are formed to have a relative angle between a direction of a tooth trace of the internal spline part with respect to the rotation axis and a direction of a tooth trace of the external spline part with respect to the rotation axis.

3. The propeller shaft according to claim 2, wherein the direction of the tooth trace of the internal spline part is parallel to the rotation axis, and wherein the direction of the tooth trace of the external spline part is inclined with respect to the rotation axis.

4. The propeller shaft according to claim 3, wherein:
the second shaft piece includes a third taper part in its outer periphery;

the third taper part is formed at a first end of the external spline part such that an outer radius of the second shaft piece gradually decreases in the third taper part from the first end of the external spline part toward the first end side of the second shaft piece and such that a groove of the external spline part is open-ended at the third taper part, wherein the outer radius is a distance from the rotation axis to the outer periphery of the second shaft piece; and the lower-surface-roughness portion is set lower in surface roughness than the third taper part.

5. The propeller shaft according to claim 1, wherein the surface roughness of the lower-surface-roughness portion has an arithmetic mean roughness value Ra of 6 μm or less.

6. The propeller shaft according to claim 1, wherein the external spline part includes a tooth structured to be inserted into the groove of the internal spline part within its region of elastic deformation.

7. The propeller shaft according to claim 1, wherein the first taper part is formed such that a minor angle between the first taper part and the rotation axis is less than a minor angle between the second taper part and the rotation axis.

8. A propeller shaft comprising:
a shaft unit for transmitting a driving force from a drive source to a driving wheel, wherein the shaft unit includes a first shaft piece and a second shaft piece, wherein:
the first shaft piece includes a tubular section at its first end side;
the tubular section of the first shaft piece includes an internal spline part and a taper part in its inner periphery;
the second shaft piece includes an external spline part in an outer periphery of its first end side, wherein the first end side of the second shaft piece is structured to be inserted into the tubular section of the first shaft piece via the first end side of the first shaft piece, and wherein the external spline part is structured to fit with the internal spline part;
the taper part is formed at a first end of the internal spline part in a direction of a rotation axis of the shaft unit such that an inner radius of the tubular section gradually increases in the taper part from the first end of the internal spline part toward a first end side of the tubular section in the direction of the rotation axis and such that a groove of the internal spline part is open-ended at the taper part, wherein the inner radius is a distance from the rotation axis to the inner periphery of the tubular section; and
the taper part includes a lower-surface-roughness portion in its surface, wherein surface roughness of the lower-surface-roughness portion has an arithmetic mean roughness value Ra of 6 μm or less.

9. The propeller shaft according to claim 8, wherein the external spline part includes a tooth structured to be inserted into the groove of the internal spline part within its region of elastic deformation.

10. A production method for a propeller shaft,
the propeller shaft comprising:
a shaft unit for transmitting a driving force from a drive source to a driving wheel, wherein the shaft unit includes a first shaft piece and a second shaft piece, wherein:
the first shaft piece includes a tubular section at its first end side;
the tubular section of the first shaft piece includes, in its inner periphery, an internal spline part, a first taper part, a first larger-radius part, a second taper part, and a second larger-radius part;

the first taper part is formed at a first end of the internal spline part in a direction of a rotation axis of the shaft unit such that an inner radius of the tubular section gradually increases in the first taper part from the first end of the internal spline part toward a first end side of the tubular section in the direction of the rotation axis and such that a groove of the internal spline part is open-ended at the first taper part, wherein the inner radius is a distance from the rotation axis to the inner periphery of the tubular section;

the first larger-radius part is formed closer to the first end side of the tubular section in the direction of the rotation axis than the first taper part such that the first larger-radius part has an inner radius greater than a distance from the rotation axis to the groove of the internal spline part;

the second taper part is formed at a second end of the internal spline part in the direction of the rotation axis such that the inner radius of the tubular section gradually increases in the second taper part from the second end of the internal spline part toward a second end side of the tubular section in the direction of the rotation axis and such that the groove of the internal spline part is open-ended at the second taper part;

the second larger-radius part is formed closer to the second end side of the tubular section in the direction of the rotation axis than the second taper part such that the second larger-radius part has an inner radius greater than the distance from the rotation axis to the groove of the internal spline part; and the second shaft piece includes an external spline part in an outer periphery of its first end side, wherein the first end side of the second shaft piece is structured to be inserted into the tubular section of the first shaft piece via the first end side of the first shaft piece, and wherein the external spline part is structured to fit with the internal spline part;

the production method comprising:
a first taper part cutting operation in which a surface of the first taper part is cut by machining to be lower in surface roughness than one of the second taper part, the first larger-radius part, or the second larger-radius part;
a second taper part cutting operation in which a surface of the second taper part is cut by machining;
a first larger-radius part cutting operation in which a surface of the first larger-radius part is cut by machining;
a second larger-radius part cutting operation in which a surface of the second larger-radius part is cut by machining; and
an insertion operation in which the second shaft piece is inserted into the tubular section of the first shaft piece via the first end side of the first shaft piece.

11. The production method according to claim 10, wherein the first taper part cutting operation is implemented by machining at a slower feed speed than one of the second taper part cutting operation, the first larger-radius part cutting operation, or the second larger-radius part cutting operation.

12. The production method according to claim 11, wherein the first taper part cutting operation and the first larger-radius part cutting operation are implemented in succession by using a same tool.

\* \* \* \* \*